United States Patent
Gastal

[11] Patent Number: 5,894,723
[45] Date of Patent: Apr. 20, 1999

[54] ROCKET ENGINE NOZZLE WITH EJECTABLE INSERTS

[75] Inventor: Joseph Gastal, Boulogne-Billancourt, France

[73] Assignee: Societe Europeenne de Propulsion, Suresnes, France

[21] Appl. No.: 08/947,132

[22] Filed: Oct. 8, 1997

[30] Foreign Application Priority Data

Oct. 11, 1996 [FR] France .................................. 96 12429

[51] Int. Cl.$^6$ .................................................. F02K 9/97
[52] U.S. Cl. .................................. 60/271; 239/265.15
[58] Field of Search ............... 60/242, 271; 239/265.11, 239/265.15, 265.19

[56] References Cited

U.S. PATENT DOCUMENTS

| | | | |
|---|---|---|---|
| 3,079,752 | 3/1963 | Theilman | 239/265.15 |
| 3,237,402 | 3/1966 | Steverding | 60/35.6 |
| 3,253,403 | 5/1966 | Hayes | 239/265.15 |
| 3,776,466 | 12/1973 | Ray | 239/265.15 |
| 4,334,614 | 6/1982 | Gill et al. | 60/271 |
| 5,779,151 | 7/1998 | Sutton | 239/265.15 |

FOREIGN PATENT DOCUMENTS 2705738 12/1994 France .
2724979 3/1996 France .

*Primary Examiner*—Louis J. Casaregola
*Attorney, Agent, or Firm*—Weingarten, Schurgin, Gagnebin & Hayes LLP

[57] ABSTRACT

The diverging part of the nozzle comprises an outer diverging part and at least one inner diverging part of outlet section that is smaller than that of the outer diverging part and designed to be separated therefrom and released at a predetermined instant in the operation of the combustion chamber corresponding to a predetermined altitude of the rocket engine. The inner diverging part comprises at least a first insert constituted by a cellular filling material associated with a stiffening structure and with a refractory material defining the inner wall of the first insert which is subjected to the hot gas produced in the combustion chamber associated with the nozzle, such that the mean specific gravity of the first insert lies in the range about 0.2 to about 0.4. Pressure-limiting means are interposed between the first insert and the outer diverging part and the first insert is fixed to the outer diverging part by rigid fixing means associated with selective cutting-off means.

17 Claims, 5 Drawing Sheets

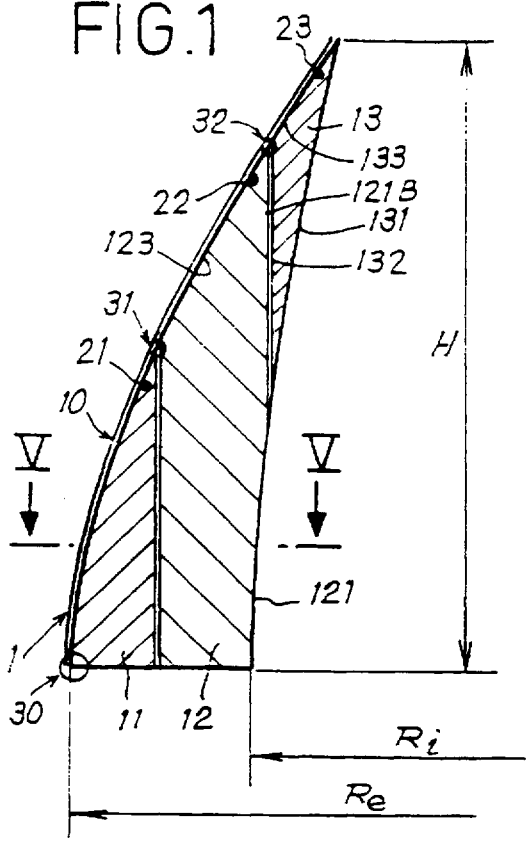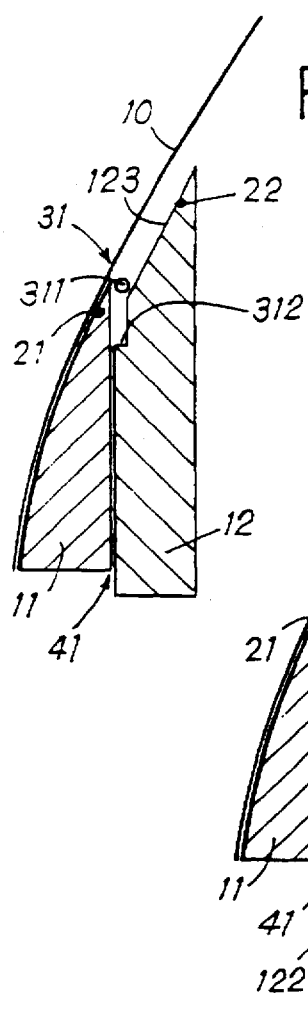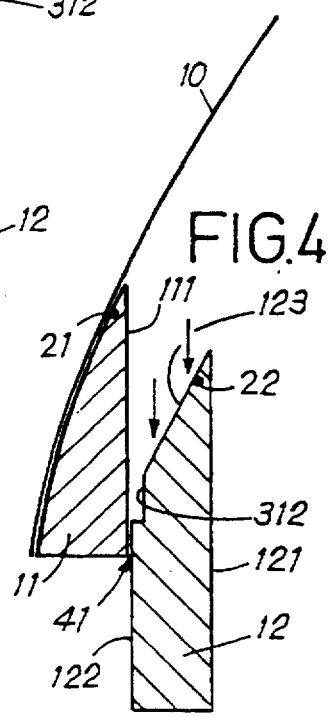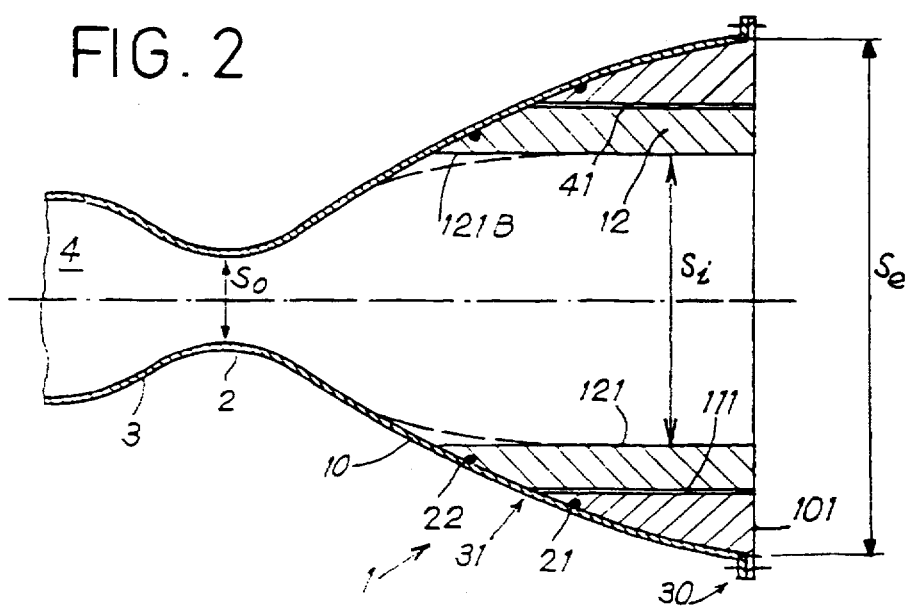

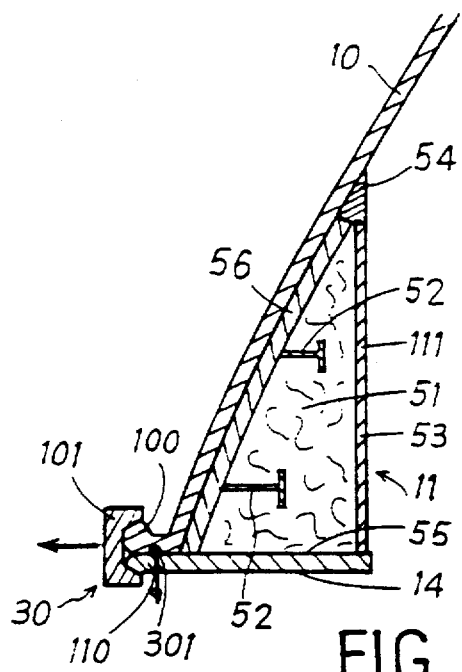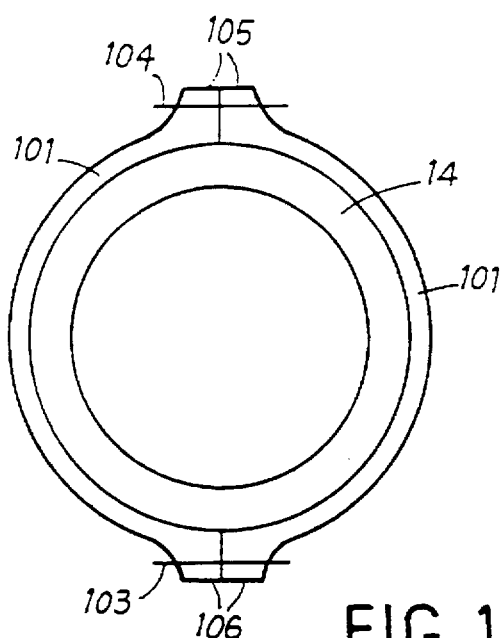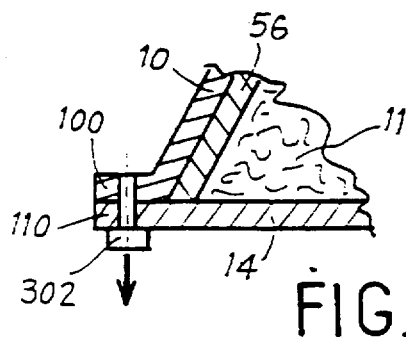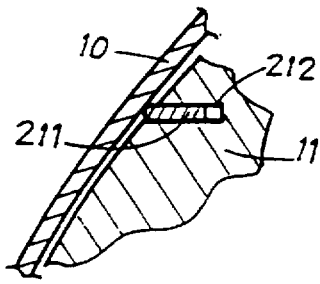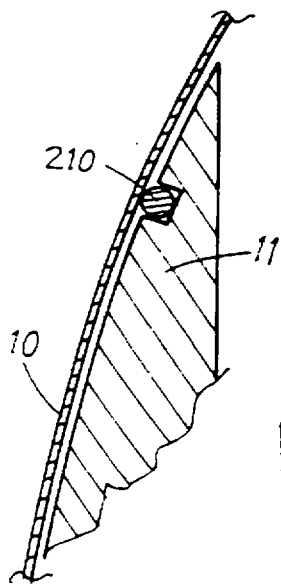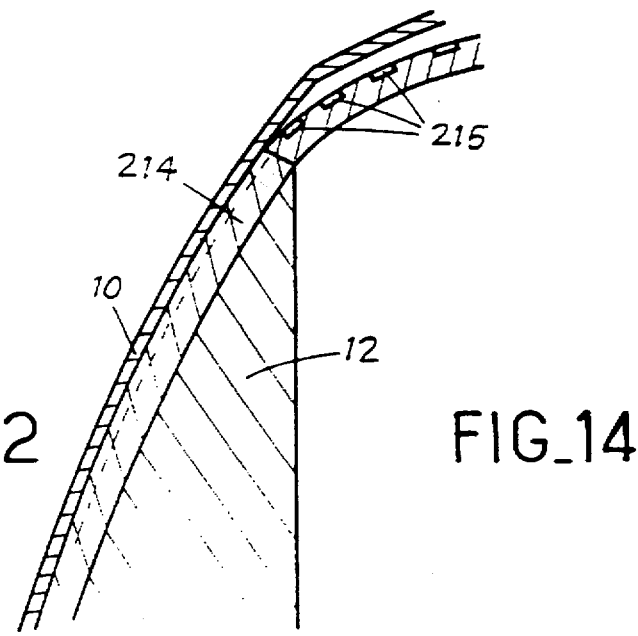

ROCKET ENGINE NOZZLE WITH EJECTABLE INSERTS

The present invention provides a rocket engine nozzle, in particular for the first stage of a launcher, the nozzle comprising a converging part receiving hot gas produced in a combustion chamber, a nozzle throat of small section, and a diverging part connected to the nozzle throat and terminating at its downstream end by a gas outlet section defining a high section ratio, the diverging part comprising an outer diverging part connected to the nozzle throat and at least one inner diverging part of outlet section that is smaller than that of the outer diverging part and engaged in the outer diverging part and connected thereto by link means associated with means for selectively destroying said link means to enable the inner diverging part to be separated and expelled at a predetermined instant in the operation of the combustion chamber, corresponding to a predetermined altitude of the rocket engine.

PRIOR ART

Various solutions have already been proposed for the purpose of modifying the shape of the diverging part of a rocket engine nozzle in the first stage of a launcher so as to adapt the diverging part to ambient conditions which vary in flight.

Under given operating conditions, accurate matching of a nozzle can be obtained only at a single altitude corresponding to a determined ambient pressure. Nozzles are generally optimized as a function of the overall performance of the stage, which usually leads to nozzles that are over-expanded, and providing thrust that reaches a maximum at a relatively high altitude which is said to be "matched". At the matched altitude, the static gas pressure Pe in the outlet section of the nozzle is substantially equal to the ambient pressure Pa which is relatively low. The matched altitude may, for example, be situated at about 10 km above ground level. Throughout flight from the ground up to the matched altitude, the static gas pressure Pe in the outlet section of the nozzle is well below ambient pressure. In this stage during which the nozzle is over-expanded, and in particular on starting when the ambient pressure Pa corresponds to atmospheric pressure at ground level, there occurs a phenomenon whereby the jet separates from the wall of the diverging part, thereby giving rise to instabilities in the jet and to disturbances (vibration, aeroelastic coupling, lateral forces) which put a limit, at design level, on increasing performance, which limit is set specifically by the section ratio.

In order to avoid the phenomenon of jet separation, proposals have already been made, in particular in documents FR-A-2 568 316 and FR-A-2 457 390, to make nozzles of variable geometry, comprising a first diverging part of relatively short length and small outlet section which is used in an initial stage of flight from the ground, together with one or more lengths of diverging part which are connected to the first diverging part downstream therefrom so as to extend it and create a greater outlet section when the rocket engine reaches a certain altitude at which ambient pressure is lower. Such types of nozzle having deployable diverging parts enable better matching to be achieved for the rocket engine during various stages of flight, however they also imply an embodiment of increased complexity, of increased cost, and of increased on-board mass, and they do not always guarantee safe and satisfactory operation, given the fragile nature of deployment mechanisms and the difficulty of ensuring that the various lengths of the diverging part are properly aligned in spite of the loads due to the jet reattaching itself to the lengths.

Apart from problems associated with deployment as such, the use of a deployable diverging part on a rocket engine also presents constraints concerning engine architecture.

Also known, in particular from documents U.S. Pat. No. 3,925,982 or FR-A-2 618 488, is the use of a diverging part of fixed section ratio, in which the relatively large outlet section optimizes operation at altitude in an environment of low external pressure, in association with means for use on starting and during an initial stage of flight at low altitude to stabilize separation of the gas jet from the wall of the diverging part at a determined distance from the outlet section. Nevertheless, until now proposals for stabilizing separation of the jet have relied essentially on injecting fluid in the form of a ring through the wall of the diverging part. The need to use a fluid and to control the injection thereof into the diverging part increases the complexity of the system and tends to reduce its reliability.

Proposals have also been made, for example in document FR-A-2 503 794, to make use on starting and at low altitude, of a diverging part of small outlet section and which is installed inside a diverging part of greater outlet section. Once the rocket engine has reached an altitude such that the diverging part of greater outlet section can operate without any risk of the jet separating, the inner diverging part of smaller section is separated and released.

Such a system for adapting a rocket engine nozzle by means of a thin-walled insert connected to the wall of an outer diverging part suffers from difficulties of manufacture and of implementation. In particular, while the thin-walled insert is being ejected, it tends to tilt and move sideways, thus giving rise to a danger of it colliding with the outer diverging part and disturbing the motion of the launcher. In such a configuration, flow pressures between the diverging part and the insert transmit large forces to the structure of the diverging part, thereby requiring it to be reinforced and thus made heavier. The overall performance of the launcher is thus reduced.

OBJECT AND BRIEF SUMMARY OF THE INVENTION

The present invention seeks to remedy the abovementioned drawbacks and to enable a rocket engine nozzle to be well matched to varying conditions of flight from the ground up to an altitude where ambient pressure is low, without implementing a mechanism for deploying extenders for a diverging part, nor a system for injecting fluid, and while guaranteeing that launcher trajectory and stability do not suffer from various changes to the geometry of the nozzle.

The invention seeks in particular to confer a good degree of matching to a rocket engine nozzle, with satisfactory overall efficiency, and while also providing simplicity of manufacture and in operation.

The invention also seeks to reduce the lateral forces applied to the nozzle during firing thereof.

These objects are achieved by a rocket engine nozzle, in particular for the first stage of a launcher, the nozzle comprising a converging part receiving hot gas produced in a combustion chamber, a nozzle throat of small section, and a diverging part connected to the nozzle throat and terminating at its downstream end by a gas outlet section defining a high section ratio, the diverging part comprising an outer diverging part connected to the nozzle throat and at least one inner diverging part of outlet section that is smaller than that of the outer diverging part and engaged in the outer diverging part and connected thereto by link means associated with means for selectively destroying said link means to enable the inner diverging part to be separated and expelled at a predetermined instant in the operation of the combustion chamber, corresponding to a predetermined altitude of the rocket engine, wherein:

- the inner diverging part includes at least a first insert disposed inside the outer diverging part so as to be concentric therewith and so as to stiffen the outer diverging part during transient stages of starting or of ejecting the inner diverging part;
- said first insert comprises a cellular filling material associated with a stiffening structure and with a refractory material defining the inner wall of said first insert which is subjected to the hot gas produced in the combustion chamber, such that the mean specific gravity of said first insert lies in the range about 0.2 to about 0.4;
- pressure-limiting means are interposed between said first insert and the outer diverging part to limit the forces transmitted to the outer diverging part; and
- said first insert is fixed to the outer diverging part by rigid fixing means associated with selective cutting-off means.

The nozzle of the present invention makes it possible to increase the performance of the stages of a launcher that starts at ground level or in the low layers of the atmosphere, and that is required to operate in the vacuum of space.

The nozzle of the invention may have an outer diverging part that is conventional, being made of a thin shell which is optimized for vacuum operation, with a maximum section ratio $\epsilon$ determined by the mass-thrust exchange value for the stage under consideration.

While operating at ground level or in the dense layers of the atmosphere, the system of an internal diverging part made up of inserts serves to match the section ratio to a value which reduces the lateral forces on firing and to eliminate any disturbing effect thereof due to the jet separating.

Because an inner diverging part is present comprising at least one inner insert of low density that provides reinforcement during the stage of flight that takes place in the atmosphere, the outer diverging part can retain the form of a thin structure, thereby contributing to saving mass for operation in a vacuum.

The pressure-limiting function, which can be implemented by a more or less effective sealing function, prevents upstream pressure from establishing itself between the inner inserts and the outer wall of the diverging part, thereby limiting the forces transmitted to the shell of the outer diverging part and minimizing the overall mass of the structure.

Because of its modular design, the invention can be applied in particular to existing engines in order to improve the performance thereof.

The first insert may have an inner wall that is cylindrical or that is streamlined.

In a particular embodiment of the invention, enabling the nozzle to be optimized, the inner diverging part comprises a set of concentric ejectable inserts, each insert comprising a cellular filling material associated with a stiffening structure and with a refractory material defining the inner wall of each insert that is subjected to the hot gas produced in the combustion chamber, such that the mean specific gravity of each insert lies in the range about 0.2 to about 0.4; the various inserts are connected to one another by rigid fixing means associated with selective cutting-off means; pressure-limiting means are interposed between each insert and the outer diverging part to limit the forces transmitted to the outer diverging part; and the facing walls of two adjacent concentric inserts include essentially cylindrical portions which are spaced apart from each other by annular clearance in which at least three longitudinal slideways are disposed, enabling the outer insert to slide relative to the adjacent inner insert without any risk of jamming.

Each of the ejectable concentric inserts has an inner wall that is essentially cylindrical.

The inserts which are engaged one within another in concentric manner are ejected sequentially during flight, either in gradual manner so as to match the nozzle progressively to altitude and optimize performance, or else almost instantaneously, e.g. once every 500 ms, as soon as the diverging part can operate without any risk of separation.

The number of inserts may be greater than two, and is determined as a function of how many section ratio matches are found to be worthwhile by comparing cost and performance, and by the need to ensure that each insert is ejected in controlled manner. A small amount of cylindrical guidance is required, and the limited height of the last insert to be ejected is determined by the need to prevent any risk of it tilting.

As in the case of an inner diverging part having a single insert, multiple inserts are organized concentrically and contribute to stiffening the outer diverging part during transient stages of starting or of ejection, thereby enabling the mass of the outer diverging part to be reduced for operation in a vacuum.

The shape of the internal stream constituted by the shape and the disposition of the inserts makes stable and predictable aerodynamic operation possible, both during ignition on the ground and during successive ejection stages, while also simplifying manufacture. As a result, there is no need to make use of expensive altitude simulation installations for the purposes of development and qualification.

It may be observed that the mechanisms for separating and ejecting inserts can be qualified on small-scale installations or under ground level conditions, since these mechanisms are decoupled from the engine overall and can be designed separately.

The anti-jamming and guidance device implemented in the context of the present invention prevents disturbances such as the inserts banging or tilting, which disturbances would otherwise occur during ejection under the effect of upstream pressure. In addition, given that they are rigidly connected together, the inserts are capable of withstanding the very intense vibratory conditions that obtain in high power rocket engines.

Pyrotechnic devices for separating or cutting off and initiation purposes enable the ejectable inserts to be separated and enable the movement thereof to be initiated, with the inserts then being automatically ejected by the pressure upstream.

In a particular embodiment, the inner diverging part further comprises an auxiliary insert concentric with the innermost insert and disposed inside said innermost insert, being connected thereto by rigid fixing means associated with selective cutting-off means: the auxiliary insert comprises a cellular filling material associated with a stiffening structure and with a refractory material defining the streamlined inner wall of the auxiliary insert which is subjected to the hot gas produced in the combustion chamber, such that the mean specific gravity of the auxiliary insert lies in the range about 0.2 to about 0.4; pressure-limiting means are interposed between the auxiliary insert and the outer diverging part; the facing walls of the innermost insert and of the auxiliary insert include essentially cylindrical portions spaced apart from each other by annular clearance in which there are disposed at least three longitudinal slideways enabling the auxiliary insert to slide relative to the innermost insert without any risk of jamming; and the auxiliary insert extends over only an upper fraction of the inner wall of the innermost insert.

The auxiliary insert makes it possible to streamline the initial inner wall so as to optimize performance to the greatest possible extent by improving continuity with the throat of the nozzle.

When the set of inserts is in place, it defines an inner profile that varies so as to improve the flow qualities of the ejected gas. Because of the toroidal shape of the inserts and because of the presence of the guiding slideways, manufacture is simplified, mechanical stiffness is increased, and no disturbance is caused by an insert being ejected. The cylindrical nesting of the inserts associated with the presence of a small number of guiding slideways constituting an anti-jamming device with clearance between the inserts all contribute to avoiding any tilting or offsetting of an insert while it is being ejected, thereby guaranteeing that the outer diverging part is not damaged.

The pressure-limiting means may be implemented in various ways corresponding to various embodiments.

In a first variant, the pressure-limiting means comprise a carbon felt mat capable, in operation, of accommodating radial deformation between the outer diverging part and the inner diverging part.

In a second variant, the pressure-limiting means comprise a flexile elastomer mat provided with grooves on its face facing the outer diverging part.

In a third variant, the pressure-limiting means comprise at least one silicone type elastomer O-ring.

In a fourth variant, the pressure-limiting means comprise gaskets in the form of piston rings that are only partially leakproof, so as to create headlosses and take up clearance.

By way of example, the cellular filling material comprises composite materials of cellular honeycomb structure or in the form of a resin filled with hollow microspheres.

The refractory material comprises a material selected from phenolic silica, a carbon-carbon composite, and a carbon-silicon carbide composite, as a function of the duration of exposure to the hot gas produced in the combustion chamber.

Advantageously, the nozzle includes centralized electrical control means for triggering said selective cutting-off means, and timing pyrotechnic fuses associated with said selective cutting-off means to cause the inserts to be ejected in cascade starting from the innermost insert or, where appropriate, from the auxiliary insert.

In a particular embodiment, the bottom portion of the first insert has a rigid plate defining a peripheral flange for coupling to a corresponding flange formed at the bottom peripheral portion of the outer diverging part; and pyrotechnic means are provided to cause link means between said flanges to break selectively.

According to a particular characteristic, link means comprise explosive screws having pyrotechnic charges interconnecting adjacent pairs of inserts.

According to another particular characteristic, at least some link means associated with means for selectively destroying said link means include pyrotechnic charges disposed in cavities formed in the inserts in the vicinity of the outer diverging part to generate gas of moderate temperature serving, on firing of the link means, to lift the inserts off the outer diverging part.

In a particular embodiment, at least one insert includes retractable means deployed pyrotechnically or by springs released by pyrotechnic separation devices, such that the retractable means can be caused selectively to project transversely into said hot gas jet from the combustion chamber while ejecting the insert so as to facilitate extraction thereof.

BRIEF DESCRIPTION OF THE DRAWINGS

Other characteristics and advantages of the invention appear from the following description of particular embodiments given as examples and described with reference to the accompanying drawings, in which:

FIG. 1 is a diagrammatic half-axial section of one example of the diverging part of a nozzle of the invention including two main inserts and one additional insert;

FIG. 2 is a diagrammatic axial section of a rocket engine nozzle comprising a diverging part fitted with a set of inserts in accordance with the invention;

FIGS. 3 and 4 are diagrammatic axial half-section views showing two successive steps in one example of the process of ejecting an inner insert;

FIG. 9 is a diagrammatic axial half-section view of an example of the diverging part of a nozzle of the invention that includes a single main insert;

FIG. 10 is a view from beneath and on a smaller scale of a diverging part of the type shown in FIG. 9;

FIG. 11 is a detailed view in section showing a variant fixing for the FIG. 9 diverging part using a pyrotechnic screw;

FIG. 12 is a fragmentary view in axial half-section of a diverging part of the invention which incorporates a sealing O-ring between an insert and the outer diverging part;

FIG. 13 is a view analogous to FIG. 12 showing a variant embodiment in which a resilient metal ring replaces the sealing O-ring;

FIG. 14 is a view analogous to FIG. 12 showing another variant embodiment implementing a grooved flexible elastomer mat between an insert and the outer diverging part to limit the pressure applied on the outer diverging part;

DETAILED DESCRIPTION OF PARTICULAR EMBODIMENTS OF THE INVENTION

Figure 5:
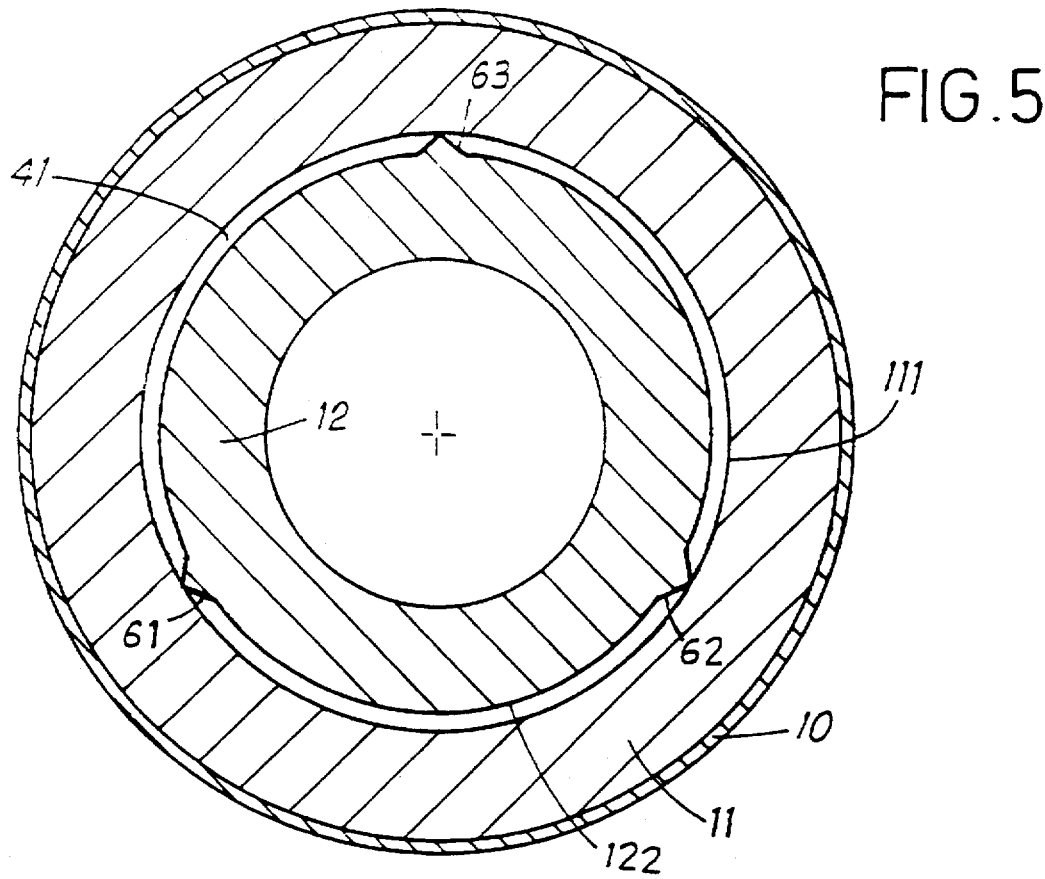
FIG. 5 is a view of the FIG. 1 diverging part in section on plane V—V of FIG. 1, and it shows an example of the anti-jamming device placed between two inserts.

FIG. 2 is a diagram of a rocket engine nozzle comprising an upstream converging part 3 receiving hot gases produced in a combustion chamber 4, a nozzle throat 2 having a flow section So, and a diverging part 10 in which the hot gases expand downstream from the throat 2 and from which they are ejected via the open downstream end of the diverging part which, in the absence of any inserts inside the diverging part 10, presents an outlet section Se.

The section ratio $\epsilon$ of the outlet section Se of the diverging part over the hot gas flow section So through the throat of the nozzle 2 defines an expansion ratio. The expansion ratio of the nozzle 1 is defined by the ratio of the pressure Po in the combustion chamber over the static pressure of the gas Pe in the outlet section of the nozzle, and the expansion ratio depends directly on the section ratio $\epsilon$.

In general, it is desirable to have an expansion ratio, and thus a section ratio $\epsilon$, that is as large as possible in order to obtain large thrust.

As already mentioned, thrust is nevertheless at a maximum only if the nozzle is matched, i.e. if the static pressure Pe of the gas in the outlet section of the nozzle is equal to the pressure of the ambient medium Pa.

If the nozzle is matched to operate at high altitude where ambient pressure Pa is very low, then the nozzle is overexpanded at ground level where the static pressure Pe of the gas in the outlet section of the nozzle is much less than ambient pressure Pa which is then equal to one bar, and with traditional diverging parts, this gives rise to a phenomenon whereby the hot gas jet separates from the wall of the diverging part 10. This jet-separation phenomenon gives rise to asymmetrical and unstable mechanical loads on the diverging part and can require structural reinforcement to be provided, thereby increasing the mass of such structures in prohibitive manner.

That is why proposals have already been made either to implement rather complex means for stabilizing the separation of the jet by using gas injection systems, or more generally to limit the length of the diverging part and its outlet section so as to avoid the phenomenon of jet separation at low altitude. This gives rise to a loss of thrust at high altitude or to the need, at high altitude, to add nozzle extension systems which greatly complicate the overall structure and make it more fragile.

The present invention stems from a different approach by implementing a rocket engine nozzle 1 for a launcher first stage having a conventional outer diverging part 10 which is optimized for operation at altitude and which can have a large section ratio $\epsilon$ (outlet section Se over throat section So). To enable it to operate properly at ground level and at low altitude without significant jet separation, a set of ejectable inserts 11, 12 is located inside the outer diverging part 10 so as to define an outlet section Si at the beginning of a mission, giving a section ratio $\epsilon$ which is then equal to the ratio of the outlet section Si over the flow section So at the throat 2, such that this initial section ratio $\epsilon$ is small enough to ensure the absence of any separation and of lateral forces at the ground. Thus, at the beginning of a mission, the initial section ratio $\epsilon$ may have a value such as to avoid the hot gas jet separating at low altitude while simultaneously reducing lateral forces on starting. For example, the initial section ratio $\epsilon$ may have a value of about 40 to 45 for a chamber pressure of $100 \times 10^5$ Pa when the diverging part is to operate at ground level, and the maximum section ratio $\epsilon$ as determined by the mass-thrust exchange value for the stage under consideration for operation of the diverging part in a vacuum can be of the order of 95 to 100.

The individual inserts 13, 12, 11 are ejected successively in cascade on reaching predetermined altitudes, such that at high altitudes, e.g. above 10 km, the nozzle 1 retains only the outer diverging part 10 and can have a high section ratio $\epsilon$ ensuring good matching, and thus increased thrust when ambient pressure is low.

The inserts 13, 12, and 11 are ejected in staggered manner by pyrotechnic triggering. It should be observed that a single electrical control can suffice, with pyrotechnic timing fuses ensuring that ejections are staggered in time. Depending on the way in which the system is optimized, the staggered ejections of the inserts 13, 12, 11 may be concentrated in time, e.g. every 500 ms, or they may be spaced apart more widely. The number of inserts, the locations of their cutoffs for ejection purposes, their shapes, and the way in which ejection thereof is staggered can all be adapted as a function of the compromise desired between rocket performance, manufacturing simplicity, and limiting mass.

The inserts 11, 12, and 13 of a nozzle of the invention are nevertheless made in such a manner as to avoid the drawbacks of existing solutions that implement a small thin-walled diverging part inside a diverging part of larger section.

Thus, according to an aspect of the present invention, the inserts 11, 12, and 13 co-operate with one another by mutual cylindrical engagement or nesting, thereby facilitating guidance during ejection, and by means of a system of clearances and guiding slideways that avoid any risk of jamming during ejection.

Figure 18:
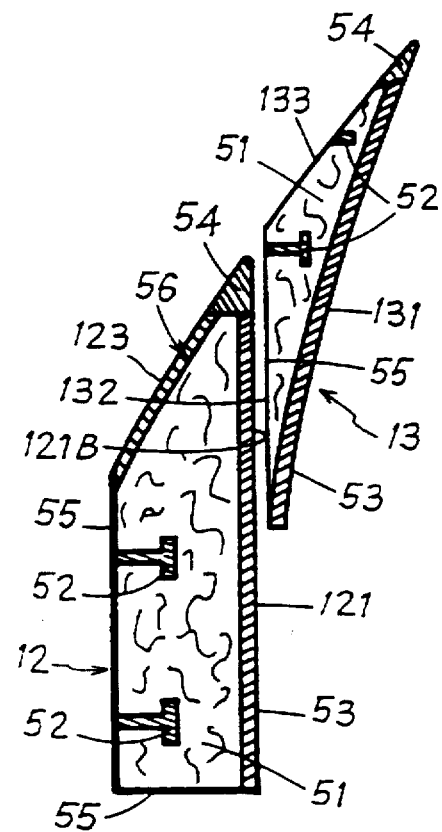
FIG. 18 is an exploded axial half-section view showing the structure of inserts suitable for use in a nozzle of the invention.

To limit the total mass of the nozzle, the inserts 11, 12, and 13 are made using structures that make it possible to achieve specific gravities of about 0.2 to about 0.4, and preferably lying in the range 0.2 to 0.3. Thus, the inserts 11, 12, and 13 may comprise a cellular filling material 51 constituted by cold composite materials having a honeycomb cellular structure (e.g. made of aluminum or of composite material) or constituted by a resin that is filled with hollow microspheres. The cellular filling material 51 is associated with a stiffening structure 52, 55 (FIG. 18). The stiffening structure may comprise a shell 55 of sheet metal or of composite material (e.g. glass epoxy or carbon epoxy), together, where appropriate, with reinforcing stiffeners 52, e.g. made of metal or of composite material, and serving to control deformation under pressure. In one possible option, the inserts may be made out of two thin sheet metal portions secured to each other by adhesive or by welding. The inner walls of these inserts which are directly exposed to the flow of hot gas may themselves be made of a refractory material 53, e.g. a material of the phenolic silica type, which suffices to withstand contact with the hot gas over a relatively short period of time, typically less than 100 seconds, or indeed a material of the carbon-silicon carbide type. The top end 54 of each insert is also preferably made out of refractory material. FIG. 18 shows examples of a structure for an inner insert 12 and for an additional insert 13, while FIG. 9 shows an example of an outer insert 11.

The various inserts 11, 12, and 13 are circularly symmetrical about the axis of the nozzle and they are mutually concentric. As can be seen in FIGS. 1 to 4 and 15 to 17, the facing walls of two adjacent inserts 11 & 12 or 12 & 13 include portions that are essentially cylindrical. The outer wall of the outer insert 11 fits to the shape of the outer diverging part 10. The outer wall 122 of the inner insert 12 comprises an essentially cylindrical portion which corresponds to the inner wall 111 of the outer insert 11. The inner insert 12 can thus slide axially relative to the outer insert 11 as shown in FIGS. 3 and 4, with the outer insert 11 then serving as a guide and as reinforcement for the outer diverging part 10.

To avoid any risk of jamming while an insert is being ejected, the inserts 11 & 12 and similarly the inserts 12 & 13 are spaced apart by annular clearance 41. This clearance makes it possible to accommodate possible deformation of the inserts 11, 12, and 13 under the action of the heat given off by the hot gas or under the action of the pressure thereof, the inner wall 111 of the insert 11 possibly being subject to deformation. While it is being ejected, the inner insert 12 may be guided by means of a set of at least three longitudinal slideways 61, 62, and 63 in the form of ribs, e.g. of triangular section (FIG. 5). Insofar as contact between the inserts 11 and 12 is concentrated along three lines of sliding, deformation of one or other of the facing insert walls gives rise merely to a bending force between bearing regions, which does not give rise to jamming. The moving and stationary portions of the slideways may be made of special material (e.g. PTFE) in order to minimize friction.

It may be observed that because of the presence of the inserts 11 and 12, the outer diverging part 10 has not been reinforced. By splitting the inserts 11 and 12 up into a plurality of elements, combined with sealing functions 22 and 21, no excessive axial force or couple is applied to the wall of the outer diverging part 10. In addition, the insert(s) remaining in place during ejection of a preceding insert contribute to reinforcing the diverging part.

As an option, in order to limit the small loss of efficiency due to the discontinuity created by the inserts 11 and 12 during the initial stage of launcher operation at ground level, if the inserts 11 and 12 are essentially cylindrical in shape, it is possible to add an additional inner insert 13 (FIGS. 1 and 18) which, like the other inserts 11 and 12 is a body of revolution, but is streamlined so that its inner wall 131 defines a gas flow channel in an upstream portion of the diverging part close to the throat of the nozzle in which the varying section increases progressively between the nozzle throat 2 and the inner cylindrical wall 121 of the insert 12 having concentric cylindrical walls, such that the upstream portion of the outer diverging part 10, the inner wall 131 of the additional insert 13, and the inner wall 121 of the cylindrical inner insert 12 define a surface which complies well with the flow of the hot gas jet during the initial stage of rocket engine operation. The additional insert 13 extends over an upper fraction only 121B of the inner wall 121 of the insert 12.

To stiffen the overall structure as well as possible, the outer wall of the outer insert 11 has a bulging shape corresponding to the shape of the outer diverging part 10, and the insert 12, the additional insert 13, or any other intermediate insert, all have respective top angular portions 123, 133, . . . which likewise fit the shape of the outer diverging part 10.

The number of main inserts 11, 12, . . . that extend to the bottom portion of the outer diverging part 10 may be greater than two, depending on the desired degree of matching. Nevertheless, this number should be less than five in order to retain the advantages of system simplicity. In all cases, clearance exists between adjacent inserts, and also between the innermost insert 12 and any additional insert 13 of shorter height and used for optimizing shape, and the longitudinal slideways such as the slideways 61 to 63 are distributed around the annular empty space between the cylindrical portions of any pair of adjacent inserts.

Sealing or pressure limitation means 21, 22, and 23 are interposed between the inserts 11, 12, and 13 and the outer diverging part 10 in order to avoid creating a device ejection force which would be taken up by the bottom end 100 of the outer diverging part 10 and would require said bottom end 100 to be reinforced excessively, thereby increasing the cost and the mass of the assembly.

When conduction along the wall of the outer diverging part 10 is sufficient, i.e. providing its temperature does not locally exceed values of about 250° C., then the sealing means 21, 22, and 23 between the wall of the outer diverging part 10 and the various inserts 11, 12, and 13 may be constituted by elastomer O-rings 210, e.g. of the silicone type (FIG. 12).

By way of example, a 10 mm diameter ring compressed to 25% can absorb deformations of about 2 mm.

When conditions at the wall of the outer diverging part 10 are very hot, it becomes necessary to admit a flow of gas between the outer diverging part 10 and the inserts 11, 12, and 13. Under such circumstances, as shown in FIG. 13, the elements 21, 22, and 23 may be constituted by resilient metal gaskets 211 in the form of piston rings which are not completely leakproof, but which allow clearance due to deformation to be taken up, and which serve to establish headlosses that minimize the amount of force that needs to be withstood. The gaskets 211 are placed in grooves 212 formed in the peripheries of the inserts 21, 22, and 23.

The function of limiting pressure on the wall of the outer diverging part 10 can be performed in a different manner.

Thus, FIGS. 9, 11, 18, and 19 show a flexible mat 56 of carbon felt which allows gas to pass between an insert 11, 12, or 13 and the outer diverging part 10 while simultaneously limiting pressure. The flexible mat 56 can absorb deformation differences while withstanding temperatures in excess of 200° C.

FIG. 14 shows a variant embodiment in which a flexible mat 214, e.g. made of an elastomer that withstands heat and is provided with grooves 215, is interposed between the outer diverging part 10 and an insert such as the insert 12. Such a flexible mat 214, which may be interposed between the outer diverging part 10 and a set of inserts 11, 12, and 13 allows gas to pass along the grooves 215 while simultaneously limiting pressure by the Venturi effect.

The variant of FIG. 14 can be advantageous particularly when the nozzle implements reinjection of hot gas together with a dump type system for cooling the diverging part (known as "dump cooling").

Which particular pressure-limiting device (flexible mat 56, grooved mat 214, 215, sealing ring 210 or 211) is selected depends on the operating conditions of the rocket engine (size, temperature, expansion) and seeks to guarantee that only acceptable forces are exerted on the shell of the outer diverging part 10, so that it can remain thin without requiring any reinforcement that would be penalizing in terms of mass.

The invention is applicable to a nozzle comprising a reinforcing inner diverging part constituted by a set of a plurality of ejectable inserts 11, 12, and 13, as shown in FIG. 1, for example.

Nevertheless, the invention also applies to a nozzle including a diverging part that is already fairly well adapted to operation at ground level, e.g. having a section ratio $\epsilon$ lying in the range about 45 to 50.

Under such circumstances, there is no need to implement an inner diverging part constituted by a plurality of inserts, and a single insert 11 suffices, as shown in FIG. 9, which insert is made in the manner described above with reference to FIGS. 9 and 18, thus enabling the quality of an existing outer diverging part 10 to be improved while reducing lateral forces and jet separation, and without requiring the preexisting structure of the outer diverging part 10 to be redesigned.

The single axially symmetrical insert 11 comprises a cellular filling material 51, reinforcing elements 52, a support structure 55 which may be constituted by a metal holding plate 14 placed radially, an inner wall 111 of refractory material 53 that withstands hot gas, a top end portion 54 likewise made of refractory material, and pressure-limiting means that may be constituted, for example, by a flexible mat 56 of carbon felt, which mat may also be replaced, in particular by a mat 214 provided with grooves 215, thereby facilitating natural detachment of the insert 11 by means of pressure once the means 30 linking it to the outer diverging part 10 are broken.

In FIG. 1, a pyrotechnic device 32 for fixing and for cutting off is represented symbolically and serves to connect the wall of the outer diverging part 10 selectively to the additional insert 13. The device 32 is located in the bottommost zone of the adjacent portion of the outer diverging part 10. In like manner, a pyrotechnic fixing and cutting-off device 31 is disposed at the bottommost zone of the portion of the insert 12 that is adjacent to the outer diverging part 10. Finally, the outer insert 11 is attached via a flange 110 formed at its bottom outer peripheral portion, to a complementary flange 100 formed at the bottom peripheral portion of the outer diverging part 10.

Figure 7:
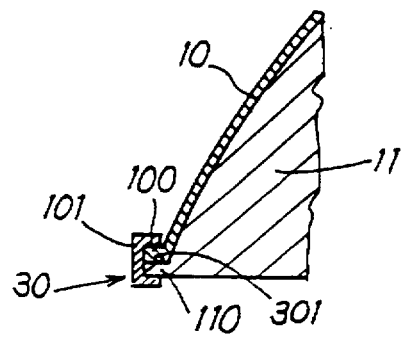
FIGS. 7 and 8 are two detail views showing examples of how the bottom peripheral portion of a last insert is fixed and separated relative to the outer element of the diverging part.
Figure 8:
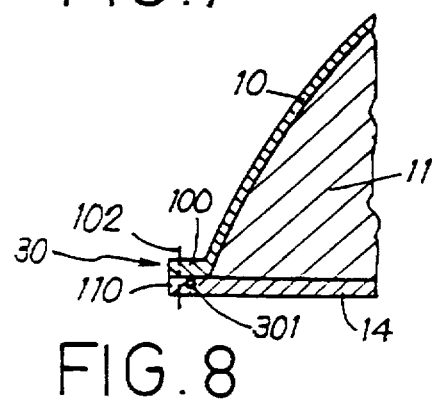

FIGS. 7 and 8 respectively show two variants of the pyrotechnic devices 30 for fixing and cutting off the outer insert 11 and the end 110 of its base 14 relative to the outer diverging part 10. Thus, in the particular embodiment shown in FIG. 7, the flanges 100 and 110 are held assembled together by two radially spaced-apart half-clips 101 of channel section. The two half-clips may be removed either by pyrotechnic bolts 103 and 104, or else a pyrotechnic cutting and ejection cord can be interposed between the two flanges 100 and 110.

In the particular embodiment of FIG. 8, the flange 100 is secured to the flange 110 which constitutes the edge of a retaining plate 14 of the insert 11 by conventional link means 102 such as bolts, and a circumferential pyrotechnic cord 301 interposed between the flanges 100 and 110 serves in like manner to separate the insert 11 at the predetermined instant at which the rocket engine reaches sufficient altitude.

Figure 6:
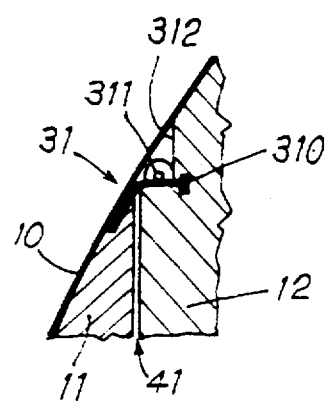
FIG. 6 is a detail view showing examples of means for fixing and cutting off inserts relative to the outer element of the diverging part.

FIG. 6 shows an embodiment of the device 31 for fixing and cutting off the inner insert 12. This embodiment can also be applied to the device 32 for fixing and cutting off the additional insert 13. A metal link member 310 connects the outer diverging part 10 to the insert 12. The link member 310 is anchored in the insert 12 in the bottom zone of the portion of the insert 12 which is adjacent to the outer diverging part 10. An outer annular notch 312 forms a shoulder on which the metal link member 310 rests in the peripheral portion of the insert 11 to receive a pyrotechnic cutting cord.

FIGS. 3 and 4 show the process whereby the insert 12 is ejected (with the additional insert 13, if one exists as shown in FIG. 1, having been ejected earlier on by a similar process).

In a first step (FIG. 3), once the order to eject the insert 12 has been given by an electronic control, the pyrotechnic cutting cord 311 is ignited, thereby causing the metal link member 310 to break, and also generating a reaction effect which starts the ejection movement of the insert 12 by causing the O-ring 22 between the insert 12 and the outer diverging part 10 to lift off. After the O-ring 22 has lifted off, pressure is applied to the essentially frustoconical top face 123 of the insert 12, and the insert is ejected naturally by the upstream pressure. The insert 12 is guided in its ejection movement by the slideways 61, 62, and 63 (FIG. 5).

As mentioned above, the individual inserts 13, 12, and 11 are ejected in cascade starting from the innermost insert (insert 13 in FIG. 1 or insert 12 in FIG. 2) once the launcher has reached a certain altitude. This can be triggered using a single electrical control, with pyrotechnic fuses causing the firing of the devices 32, 31, and 30 to be staggered over time, and consequently causing the ejections of the inserts 13, 12, and 11 to be staggered over time.

The dimensions, the number, and the shapes of the inserts need to be adapted to various types of requirement.

For example, in an embodiment having three inserts 11, 12, and 13, as shown in FIG. 1, as applied to an outer diverging part 10 having a radius Re of 1350 mm giving a section ratio $\epsilon$=97, the total height H of the inserts 11 to 13 may be greater than equal to 1500 mm, and the cylindrically mutually engaged inserts 11 and 12 may have an inner radius Ri of 860 mm imparting a section ratio $\epsilon$=40 at the beginning of the mission when all of the inserts 11 to 13 are in place. Under such circumstances, between the beginning and the end of the mission, the section ratio can vary in steps from 40 to 97, thereby enabling operation to be optimized.

The nozzle of the invention having concentric inserts can be made in a wide variety of different embodiments.

When using a single insert 11, FIGS. 9 and 10 show link means 30 which constitutes a combination of the means shown in FIGS. 7 and 8. Thus, the end of the holding plate 14 constitutes a flange 110 which, together with the flange 100 of the outer diverging part 10, is inserted in two half-clips 101 each being generally of channel section. FIG. 10 shows the ends 105 and 106 of the half-clips 101 which are united by explosive bolts 103 and 104. Such a structure is easily fitted to existing outer diverging parts 10. When the insert 11 needs to be ejected, the explosive bolts 103 and 104 are fired, thereby enabling the half-clips 101 to be ejected radially. The circumferential pyrotechnic cord 301 interposed between the flanges 100 and 110 enables the holding plate 14 to be cut off, thereby releasing the insert 11 which is lifted off and expelled naturally by the upstream pressure. Implementing a grooved flexible mat 214, 215 between the insert 11 and the outer diverging part 10 can make it easier to lift off the insert 11, thereby avoiding the need to use a cord 301.

FIG. 11 shows another variant of the embodiment of FIGS. 7 and 8, in which the flange 100 and the end 110 of the holding plate 14 or soleplate are connected together by pyrotechnic bolts 302 which replace the half-clips 101 and the cord 301 of FIG. 7 or the bolts 102 and the cord 301 of FIG. 8.

Figure 19:
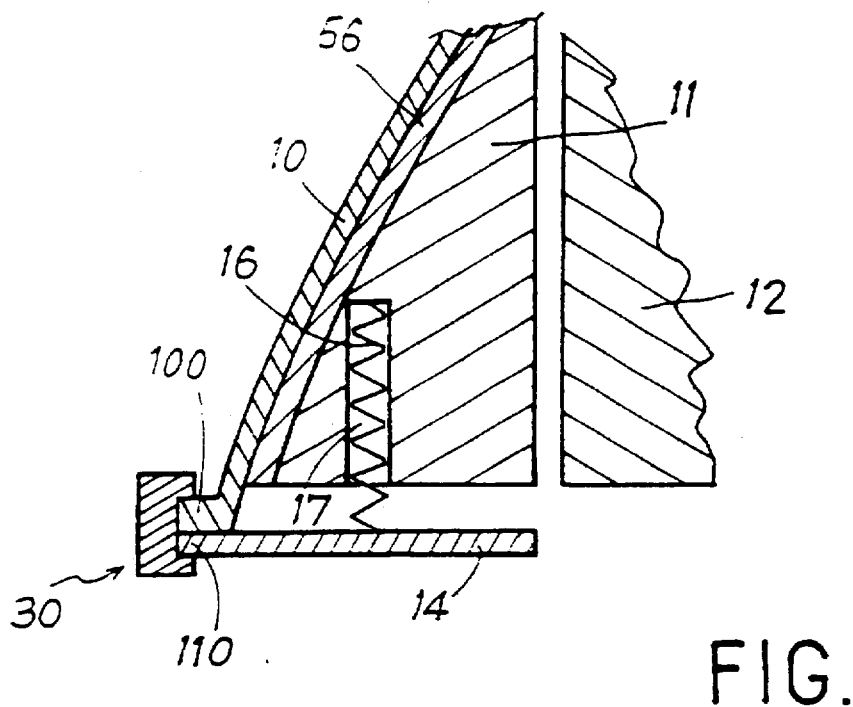
FIG. 19 is a diagrammatic axial half-section view of a diverging part of a nozzle of the invention, fitted with a system for accommodating deformation between an insert and the shell of the outer diverging part.

FIG. 19 shows the implementation of a system for accommodating deformation of an insert 11 in the case where a pressure-limiting flexible mat 56 is insufficient for absorbing deformation between the insert 11 and the outer diverging part 10. The system for taking up deformation comprises springs 16 distributed around the circumference of the insert 11 and disposed in housings 17 formed in the insert 11. The springs 16 which press against the holding plate 14 ensure that the insert 11 continues to remain pressed against the shell of the outer diverging part 10 regardless of any deformation of the insert 11 or of the outer diverging part 10.

Figure 20:
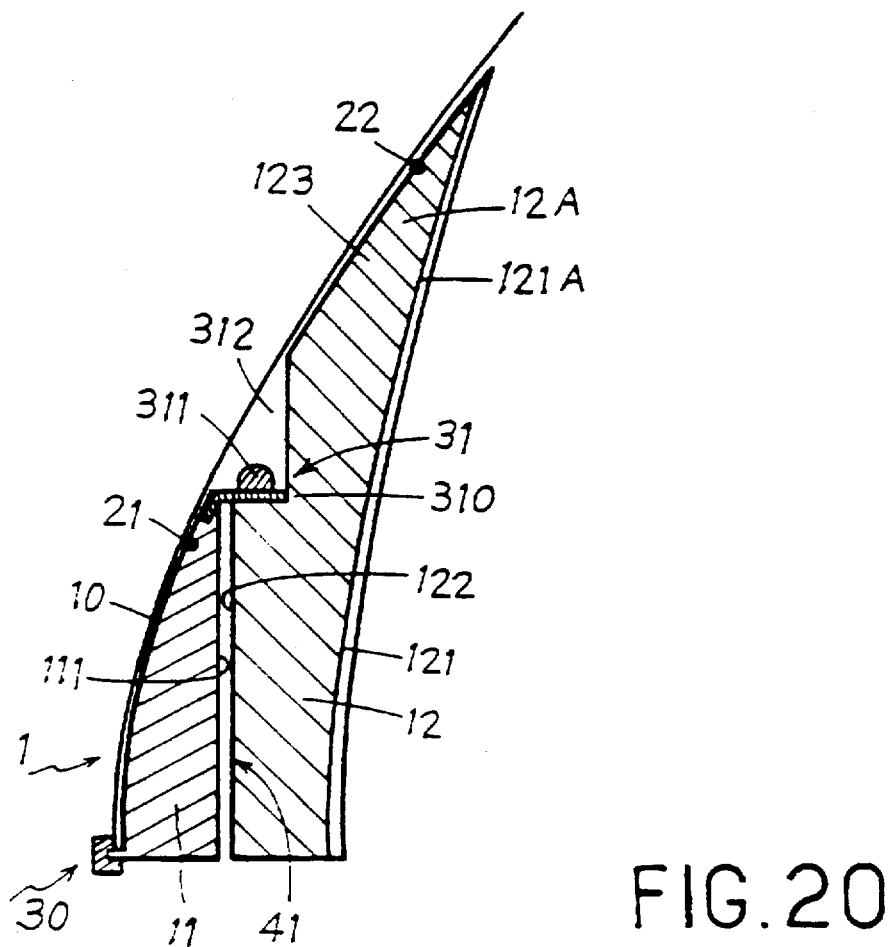
FIG. 20 is a diagrammatic axial half-section view of a particular embodiment of a diverging part of a nozzle of the invention including two main inserts with a streamlined inner insert.

FIG. 20 shows an embodiment similar to that of FIGS. 3 and 4, but having an inner insert 12 which includes a streamlined inner wall 121 defining a top portion 121A connecting with the throat of the nozzle so that no additional inner insert 13 is implemented, and the inner insert 12 can go all the way down to the base of the diverging part 10.

Figure 15:
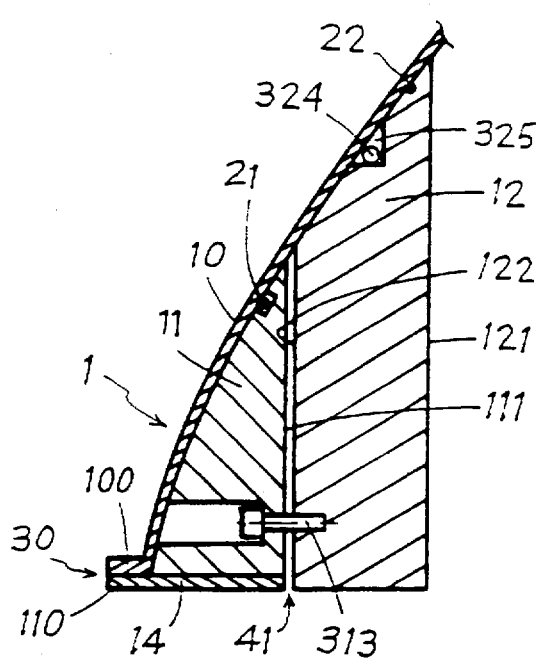
FIG. 15 is a diagrammatic axial half-section view of a diverging part of a nozzle of the invention including two main inserts fitted with a separable link device between inserts which is decoupled from the ejection devices for the inserts.
Figure 17:
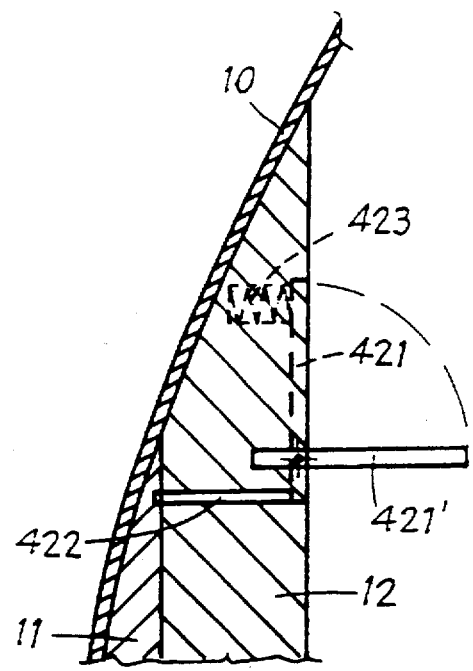
FIG. 17 is a diagrammatic axial half-section view of another example of the diverging part of a nozzle of the invention including two main inserts, one of which is provided with insert ejection means comprising a pivoting flap system.
Figure 16:
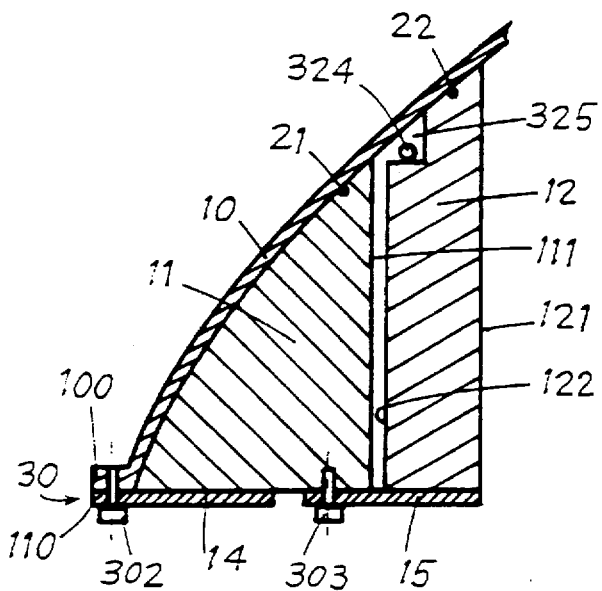
FIG. 16 is a diagrammatic axial half-section view of a diverging part analogous to that of FIG. 15, but incorporating a variant embodiment of the separable link device between inserts and using pyrotechnic screws.

FIGS. 15 to 17 show various embodiments in which the separator and ejector devices of the inserts 11 and 12 are decoupled, unlike an embodiment such as that shown in FIG. 6 where both functions are located in the same place.

In FIG. 15, there can be seen a pyrotechnic charge 324 disposed in a cavity 325 formed in the insert 12 in the vicinity of the wall of the outer diverging part 10. The ejection charge 324 is selected so as to generate gas that is not too hot for the purpose of lifting the insert 12 off the outer diverging part 10, with the combustion gases infiltrating between the outer diverging part 10 and the insert 12 to enable said insert 12 to be ejected once it has been separated from the insert 11 by breaking of the radial pyrotechnic bolts 303 connecting the insert 12 to the insert 11.

FIG. 16 shows an embodiment in which a pyrotechnic charge 324 can be disposed in a cavity 325 formed in the insert 12, as in the embodiment of FIG. 15, for the purpose of ejecting the insert 12. In FIG. 16, there can be seen an insert 11 resting on a holding plate 14 whose end 110 is connected to the peripheral flange 100 of the outer diverging part 10 by pyrotechnic bolts, and also shown in FIG. 11. The insert 12 is not directly connected to the insert 11 by pyrotechnic bolts as in FIG. 15, but rests on a metal holding plate 15 which extends beneath the insert 11 and is connected thereto by pyrotechnic bolts 303 which perform the function of separating the insert 12.

FIG. 17 shows a retractable flap 421 which, at rest, is in a raised position parallel to the axis of the diverging part, acting against springs 423, and which is held in this position by link means 422 between the insert 12 and the insert 11. When the link means 422 are released by pyrotechnic action, the springs 423 enable the flap 421 to be deployed into a position 421' where it projects transversely into the hot gas jet coming from the combustion chamber, thereby facilitating extraction of the insert 12.

In general, it is possible to combine the various embodiments described above with one another. Also, in some cases, it is possible deliberately to de-optimize the shape of the diverging part so as to limit the total length thereof, since that can give rise to mechanical problems given that the large amount of cantilevered-out inertia requires the steering control actuators to be reinforced or requires the structures of the combustion chamber to be reinforced. A diverging part is then obtained which is more compact, having a section ratio that can be increased to compensate for the loss of efficiency due to its shape no longer being optimum. In any event, the use of inserts of the invention makes it possible to improve the performance and mechanical strength. Also, the use of concentric inserts of tubular shape made of cellular material makes it easy to compute the characteristics thereof and it becomes possible to establish a definable modular system without it being necessary to redesign the entire diverging part on each occasion.

I claim:

1. A rocket engine nozzle, in particular for the first stage of a launcher, the nozzle comprising a converging part receiving hot gas produced in a combustion chamber, a nozzle throat of small section, and a diverging part connected to the nozzle throat and terminating at its downstream end by a gas outlet section defining a high section ratio, the diverging part comprising an outer diverging part connected to the nozzle throat and at least one inner diverging part of outlet section that is smaller than that of the outer diverging part and engaged in the outer diverging part and connected thereto by link means associated with means for selectively destroying said link means to enable the inner diverging part to be separated and expelled at a predetermined instant in the operation of the combustion chamber, corresponding to a predetermined altitude of the rocket engine, wherein:

the inner diverging part includes at least a first insert disposed inside the outer diverging part so as to be concentric therewith and so as to stiffen the outer diverging part during transient stages of starting or of ejecting the inner diverging part;

said first insert comprises a cellular filling material associated with a stiffening structure and with a refractory material defining the inner wall of said first insert which is subjected to the hot gas produced in the combustion chamber, such that the mean specific gravity of said first insert lies in the range about 0.2 to about 0.4;

pressure-limiting means are interposed between said first insert and the outer diverging part to limit the forces transmitted to the outer diverging part; and said first insert is fixed to the outer diverging part by rigid fixing means associated with selective cutting-off means.

2. A nozzle according to claim 1, wherein the first insert has an inner wall that is cylindrical.

3. A nozzle according to claim 1, wherein the first insert has an inner wall that is streamlined.

4. A nozzle according to claim 1, wherein:

the inner diverging part comprises a set of concentric ejectable inserts, each insert comprising a cellular filling material associated with a stiffening structure and with a refractory material defining the inner wall of each insert that is subjected to the hot gas produced in the combustion chamber, such that the mean specific gravity of each insert lies in the range about 0.2 to about 0.4;

the various inserts are connected to one another by rigid fixing means associated with selective cutting-off means;

pressure-lifting means are interposed between each insert and the outer diverging part to limit the forces transmitted to the outer diverging part; and the facing walls of two adjacent concentric inserts include essentially cylindrical portions which are spaced apart from each other by annular clearance in which at least three longitudinal slideways are disposed, enabling the outer insert to slide relative to the adjacent inner insert without any risk of jamming.

5. A nozzle according to claim 4, wherein each of the ejectable concentric inserts has an inside wall that is essentially cylindrical.

6. A nozzle according to claim 4, wherein:

the inner diverging part further comprises an auxiliary insert concentric with the innermost insert and disposed inside said innermost insert, being connected thereto by rigid fixing means associated with selective cutting-off means;

the auxiliary insert comprises a cellular filling material associated with a stiffening structure and with a refractory material defining the streamlined inner wall of the auxiliary insert which is subjected to the hot gas produced in the combustion chamber, such that the mean specific gravity of the auxiliary insert lies in the range about 0.2 to about 0.4;

pressure-limiting means are interposed between the auxiliary insert and the outer diverging part;

the facing walls of the innermost insert and of the auxiliary insert include essentially cylindrical portions spaced apart from each other by annular clearance in which there are disposed at least three longitudinal slideways enabling the auxiliary insert to slide relative to the innermost insert without any risk of jamming; and the auxiliary insert extends over only an upper fraction of the inner wall of the innermost insert.

7. A nozzle according to claim 1, wherein the pressure-limiting means comprise a carbon felt mat capable, in operation, of accommodating radial deformation between the outer diverging part and the inner diverging part.

8. A nozzle according to claim 1, wherein the pressure-limiting means comprise a flexile elastomer mat provided with grooves on its face facing the outer diverging part.

9. A nozzle according to claim 1, wherein the pressure-limiting means comprise at least one silicone type elastomer O-ring.

10. A nozzle according to claim 1, wherein the pressure-limiting means comprise gaskets in the form of piston rings that are only partially leakproof, so as to create headlosses and take up clearance.

11. A nozzle according to claim 1, wherein the cellular filling material comprises composite materials of cellular honeycomb structure or in the form of a resin filled with hollow microspheres.

12. A nozzle according to claim 1, wherein the refractory material comprises a material selected from phenolic silica, a carbon-carbon composite, and a carbon-silicon carbide composite, as a function of the duration of exposure to the hot gas produced in the combustion chamber.

13. A nozzle according to claim 1, wherein the bottom portion of the first insert has a rigid plate defining a peripheral flange for coupling to a corresponding flange formed at the bottom peripheral portion of the outer diverging part, and wherein pyrotechnic means are provided to cause link means between said flanges to break selectively.

14. A nozzle according to claim 4, including centralized electrical control means for triggering said selective cutting-off means, and timing pyrotechnic fuses associated with said selective cutting-off means to cause the inserts to be ejected in cascade starting from the innermost insert or, where appropriate, from the auxiliary insert.

15. A nozzle according to claim 4, wherein link means comprise explosive screws having pyrotechnic charges interconnecting adjacent pairs of inserts.

16. A nozzle according to claim 4, wherein at least some link means associated with means for selectively destroying said link means include pyrotechnic charges disposed in cavities formed in the inserts in the vicinity of the outer diverging part to generate gas of moderate temperature serving, on firing of the link means, to lift the inserts off the outer diverging part.

17. A nozzle according to 4, wherein at least one insert includes retractable means deployed pyrotechnically or by springs released by pyrotechnic separation devices, such that the retractable means can be caused selectively to project transversely into said hot gas jet from the combustion chamber while ejecting the insert so as to facilitate extraction thereof.

* * * * *